United States Patent Office 3,796,680
Patented Mar. 12, 1974

3,796,680
NON-CORROSIVE POLYVINYLIDENE
CHLORIDE LATEX
Charles E. Brockway and David R. Smith, Decatur, Ill., assignors to A. E. Staley Manufacturing Company, Decatur, Ill.
No Drawing. Continuation of abandoned application Ser. No. 720,375, Apr. 10, 1968. This application Mar. 31, 1972, Ser. No. 240,310
Int. Cl. C08f 29/14, 45/56
U.S. Cl. 260—29.6 MQ    12 Claims

ABSTRACT OF THE DISCLOSURE

A stabilized, substantially non-corrosive polyvinylidene chloride latex is produced by adding stabilizing quantities of an alkali metal bisulfite to a polyvinylidene chloride latex containing residual peroxides. The stabilized composition has particular utility as a coating for cellulosic substrates.

---

This is a continuation of the now abandoned application Ser. No. 720,375, filed Apr. 10, 1968.

DISCLOSURE OF INVENTION

This invention relates to a non-corrosive polyvinylidene chloride latex composition suitable for use in coating cellulosic fibers. More particularly, this invention relates to a method for rendering a polyvinylidene chloride latex containing residual peroxides substantially non-corrosive to metals.

Polyvinylidene chloride polymers, and particularly their copolymers, have been found to be particularly useful as coatings for paper, metals, plastics, etc. primarily because, after drying, they form protective coatings which are tough, flexible, transparent, heat sealable and generally moisture resistant. In addition, these coatings are substantially inert to a large number of materials such as water, acids, organic oils, fats, etc. and are relatively impermeable to many gases such as oxygen. The polyvinylidene chloride polymer can be coated on the substrate in the form of a latex or aqueous dispersion rather than as a solution in an organic solvent. This method not only avoids the use of expensive organic solvents but also reduces the need for extensive safety precautions when inflammable or toxic organic solvents are employed. It was found, however, that the application of polyvinylidene chloride latex as a coating to paper, for example, corroded and pitted the metal rolls used in the application process. In addition, small button-like accumulations of polymer were found to build up along the surface of the roll destroying the roll's smooth surface.

Although the reason for this corrosive action was not fully understood, it was believed that it could be overcome if the acidic nature of the latex was neutralized by the addition of a basic material. It was found that the corrosion by the neutralized latex emulsion was inhibited by the addition of a basic material; however, the neutralized latex emulsion became unstable and could not be stored for extended periods of time. This instability is attributed to the delicate balance of conditions and ingredients which is required to maintain the latex polymer in the amorphous state prior to coating on a paper substrate.

In U.S. Pat. 2,744,080, a method is disclosed for rendering aqueous dispersions of polyvinylidene chloride non-corrosive to metal plates at 100° C. by the addition of a small amount of hydrogen peroxide. It was found that, in the present system, the corrosive action exhibited by the emulsion or dispersion itself was not overcome by the addition of peroxides. Instead, it was found that the corrosive action of the emulsion or dispersion could be inhibited only if the residual peroxides were destroyed or neutralized.

It is, therefore, an object of this invention to provide a polyvinylidene chloride latex which exhibits non-corrosive properties on metals without losing its stable properties. Another object of this invention is to prevent corrosion of metal surfaces when a polyvinylidene chloride latex is brought in contact with metal surfaces. Another object of this invention is to provide a means for destroying or deactivating residual peroxides present in polyvinylidene chloride latexes.

These and other objects of this invention are accomplished by treating a polyvinylidene chloride latex containing residual peroxides with corrosion inhibiting quantities of a material capable of deactivating or destroying residual peroxides. Although it is not fully understood, it has been found that the corrosion caused by the polyvinylidene chloride latex can be inhibited if the residual peroxides present in the latex polymer are removed or deactivated. Although almost any material capable of neutralizing or deactivating peroxides may be used to overcome metal corrosion caused by the polyvinylidene chloride latex, the metal sulfites, and particularly the alkali metal bisulfites such as sodium meta-bisulfites, sodium bisulfite, potassium meta-bisulfite, potassium bisulfite, lithium, bisulfite, and the like have been found to yield certain desired results, as detailed hereafter.

Corrosion inhibiting quantities, for purposes of this invention, are defined as that amount which will effectively inhibit metal corrosion of the polyvinylidene chloride latex without adversely affecting the chemical and physical properties of the polyvinylidene chloride latex. In most cases, this means the removal or deactivation of substantially all of the residual peroxides present. This removal or deactivation is preferably accomplished by the addition of stoichiometric amounts of a corrosion inhibiting agent (material capable of deactivating or destroying residual peroxides in a polyvinylidene latex) based on the amount of residual hydrogen peroxide present in the latex emulsion. For example, when the corrosion inhibiting agent is an alkali metal bisulfite, neutralization or deactivation of the hydrogen peroxide can be readily achieved if one equivalent weight of the alkali metal bisulfite is added for each equivalent weight of residual peroxide present in the polymer emulsion system. An equivalent weight of alkali metal bisulfite is that amount of bisulfite which is required to neutralize or deactivate an equivalent weight of peroxide. Where the alkali metal bisulfite is sodium meta-bisulfite, one mole of sodium meta-bisulfite is required to neutralize or deactivate every two moles of hydrogen peroxide.

A surprising feature of this invention is that if the amount of alkali metal bisulfite added varies too greatly from the preferred stoichiometric ratios, complete inhibition of corrosion will not be achieved. However, good results can also be obtained if the amount of alkali metal bisulfite is varied only slightly from the preferred stoichiometric quantities. For example, an amount of alkali metal bisulfite ranging from between about 0.7 and 1.3 equivalents per equivalent weight of residual peroxide can be used and satisfactory results obtained.

The latex composition is preferably treated with a corrosion inhibiting agent at a pH of less than 5.5 and preferably at a pH of below 5.0 since at higher pH levels (greater than 5.5) some discoloration of the latex composition has been found to occur.

In addition to inhibiting corrosion, the use of alkali metal bisulfites, and particularly the use of alkali metal meta-bisulfites, also produces polymeric films and coatings which are less tacky, particularly at temperatures above room temperatures. This property of tackiness is generally referred to as "blocking" and is especially undesirable in paper coating applications, particularly where it becomes necessary to have the paper coated products in rolls or otherwise in contact, as during shipment or distribution.

The corrosion inhibitor (metal bisulfite) of this invention is effective and can be used with aqueous dispersions or latex compositions of any polymer or copolymer of vinylidene chloride. If the stabilized copolymer latex composition is to be used as a coating of, for example, paper, the copolymer latex composition will contain from about 70–97% by weight vinylidene chloride, and preferably, from about 85 and 94% by weight vinyidene chloride. The use of copolymers is of special value in coating operations such as on paper, metal foil, plastic film and especially where premature crystallization of the polymer is to be avoided. Examples of suitable ethylenically unsaturated comonomers which can be copolymerized with vinylidene chloride and which can be stabilized against corrosion by the addition of an alkali metal bisulfite include alkyl esters of alpha, beta-ethylenically unsaturated monocarboxylic acids containing from 1 to 18 carbon atoms in the alkyl group; such as methyl acrylate, ethyl acrylate, 2-ethylhexyl acrylate, methyl methacrylate, and ethyl alpha-cyanoacrylate, etc.; alpha,beta-ethylenically unsaturated acids, such as acrylic acid, methacrylic acid and itaconic acid; alpha,beta-ethylenically unsaturated nitriles, such as acrylonitrile, methacrylonitrile, and ethacrylonitrile; alpha,beta-ethylenically unsaturated ethacrylonitrile; alpha, beta-ethylenically unsaturated amides, such as methacrylamide and acrylamide; monovinyl aromatics, such as styrene and vinyl toluene; vinyl halides, such as vinyl chloride and vinyl bromide; diesters of alpha,beta-ethylenically unsaturated dicarboxylic acids, such as dimethyl itaconate, diethyl fumarate and dimethyl maleate; alkyl vinyl ethers, such as methyl vinyl ether and ethyl vinyl ether; alkyl vinyl ketones, such as methyl vinyl ketones, etc. If desired, up to about 2% by weight of the monomers used can be copolymerizable di-(ethylenically unsaturated) comonomers, such as allyl crotonate, allyl acrylate, polyhydric alcohol esters of alpha,beta-ethylenically unsaturated monocarboxylic acids, such as 1,3-butylene dimethacrylate, the diacrylate or dimethacrylate of glycol, diethylene glycol, triethylene glycol, etc.

Emulsifying agents are preferably added during the polymerization reaction to aid in dispersing the polymer and after the polymerization has been completed to enhance the stability of the dispersion. For most dispersing operations, a combination of anionic and nonionic surface active agents can be employed. Suitable anionic surface active agents include alkali metal salts of alkyl aryl sulfonates, such as sodium dodecyl benzene sulfonate, and alkali metal salts of alkyl sulfates, such as sodium lauryl sulfate. Suitable nonionic surface active agents include the alkylphenyl polyoxyethylene glycols and alkylpolyoxyethylene glycols containing from 4 to 18 carbon atoms in the alkyl group and from about 2 to 120 oxyethylene units. These compounds can be used in a weight concentration of about 0.1 to 6% of the total monomer weight with about 0.5 to 3% being best. The most advantageous concentration will depend, as in all emulsion polymerizations, in part on the emulsifier or emulsifiers used, the monomers to be polymerized, the desired particle size, the initiator system, etc.

The polymerization reaction is catalyzed by the use of any peroxidic free radical type catalyst. Suitable catalysts include inorganic or organic peroxides and hydroperoxides such as hydrogen peroxide, benzoyl peroxide, tertiary butyl hydroperoxide, diisopropyl benzene hydroperoxide, cumene hydroperoxide, caproyl peroxide, methylethyl ketone peroxide, and the like.

Frequently the polyvinylidene chloride latex will contain catalyst promoters for hastening the polymerization reaction, particularly at lower temperature, and also to avoid coagulation. Examples of suitable promoters include ascorbic acid, soluble sulfites, hydrosulfites, sulfoxalates, thiosulfates and bisulfites. Certain polyvalent ions such as ferrous ions can also be used if desired. The amount of promoter used is in a sense quite critical since large amounts of promoter, e.g. an amount greater than one mol per mol of catalyst, results in a polymerization reaction which is sluggish and generally unsatisfactory. For optimum polymerization, a catalyst to promoter mol ratio of about 2:1 is used. If the amount of peroxidic catalyst varies more than 15–25% from this preferred 2:1 mol ratio, the polymerization reaction is no only economically unfavorable but is generally unsatisfactory from a process standpoint. Under these optimum polymerization conditions, a residual amount of the peroxidic catalyst will, unless removed or neutralized, be found in the aqueous dispersions of the vinylidene chloride polymers thereby produced. Such dispersions or emulsions are, as earlier pointed out, generally unsuitable for use in paper coating operations because of their corrosive action on metal surfaces.

If desired, a preferred latex polymer (seed latex) can also be added to the polymerization system for forming polymers having particle sizes within certain desired ranges. The use of seed latexes is described in detail in copending patent application Ser. No. 563,703, filed July 8, 1966.

The polymerization is best effected at temperatures below about 95° C. The preferred range is about 30° to 70° C. with the lower portion of the range (30–45° C.) being preferred to initiate the polymerization. Slightly lower temperatures, down to 0° C., are permissible, but usually impractical. After most of the monomers have been converted to polymer, temperatures even higher than 95° C. may be employed. During polymerization, the temperature can be controlled in part by the rate at which monomers are supplied and polymerized and/or by applied cooling.

The polymerization can be carried out batchwise, if desired, by continuous addition of one or more other components employed in the polymerization.

If a more detailed description covering the production of polyvinylidene chloride emulsions or aqueous dispersions and their use in paper coating operations is desired, such additional information can be found in U.S. Pats. 2,909,499 and 3,328,330 and in copending patent application of Smith and Peterson, Ser. No. 563,703 filed July 8, 1966.

The following examples are merely illustrative and should not be construed as limiting the scope of the invention.

Example 1

The following premixtures were prepared to be used in the preparation of a polyvinylidene chloride latex:

| Emulsifier-monomer premixture: | Parts (wet wt.) |
|---|---|
| Vinylidene chloride | 2,094.5 |
| Methyl acrylate | 195.6 |
| Acrylic acid | 11.5 |
| 1,3-butylene dimethacrylate | 11.5 |
| Seed latex (20% dry solids) | 230.2 |
| Sodium dodecylbenzene sulfonate (23% dry solids) | 167.8 |
| Sodium lauryl sulfate (29% dry solids) | 23.1 |
| Disodium monodecylphenoxybenzenedisulfonate (45% dry solids basis) | 14.9 |
| Water | 302.5 |

TABLE—Continued

Reactor charge:
- $NaH_2PO_4 \cdot H_2O$ —————————— 6.0
- Citric acid·$H_2O$ —————————— 0.46
- Water —————————————————— 312.9
- Seed latex (20% dry solids) ————— 109.8
- 2% by weight $H_2O_2$ ——————— 100.0
- Vinylidene chloride ——————————— 89.5
- Methyl acrylate ——————————— 8.4
- Acrylic acid ————————————— 0.5
- 1,3-butylene dimethacrylate ———— 0.5
- Sodium dodecylbenzene sulfonate (23% dry solids) —————————————————— 7.2
- Sodium lauryl sulfate (29% dry solids) ——— 1.0
- Disodium monodecylphenoxybenzenedisulfonate (45% dry solids) —————————— 0.6

Initiating system:
- Ascorbic acid (0.8% dry solids) ————— 300.0
- 2% by weight hydrogen peroxide ————— 120

A water-cooled stainless steel glass lined reactor was charged with the above described charge. After the temperature was adjusted to 30° C., promoter (ascorbic acid) was added to the reactor at a rate of about one-half part per minute. After about 15 minutes, the addition of emulsifier-monomer premixture was started at a rate of about one-half part per minute. The temperature was maintained at between about 35–45° C. by cooling and adjusting the rate of addition of the monomer-emulsified premixture, promoter and additional catalyst. After the monomer-emulsifier premixture addition was complete (about five hours), the reaction temperature was raised to 70° C. to complete the polymerization. The cooled 60% solids composition was post-stabilized with 35 parts by weight of sodium dodecylbenzene sulfonate (23% dry solids) and had a Brookfield Viscosity at 77° . F (Model RVT, 20 r.p.m., #2 Spindle) of 34 cps.

The seed latex used in this example, which contained particles principally in the range of 0.01 to 0.05 micron, was prepared by charging a water-cooled stainless steel reactor with 0.2 part by weight $NaH_2PO_4 \cdot H_2O$, 640 parts by weight water, 20 parts by weight 2% $H_2O_2$ and 60 parts by weight of an emulsifier composition composed of 56.0 parts by weight of sodium dodecylbenzenesulfonate (23% dry solids), 5.5 parts by weight sodium lauryl sulfate (29% dry solids), 3.5 parts by weight disodium monodecylphenoxybenzenedisulfonate (45% dry solids) and 15 parts by weight water. After the temperature was adjusted to 35° C., 280 parts by weight of an emulsified monomer composition containing 180 parts by weight vinylidene chloride, 18 parts by weight methyl acrylate, 2 parts by weight methacrylic acid and the remaining 20 parts by weight of the above described emulsifier composition was added to the reactor at the rate of about 3 parts by weight per minute. At the same time, 40 parts by weight of ascorbic acid (0.8% by weight dry solids) was added over a period of about 2 hours while maintaining the reactor at between 35 to 45° C.

These examples show that the amount of sodium metabisulfite added is critical and that maximum inhibition against corrosion is achieved when substantially stoichiometric amounts of the bisulfite are used.

Examples 2–7

The polyvinylidene chloride latex prepared in Example 1 was divided into five portions. To each of the portions various amounts of sodium meta-bisulfite were added. Aluminum plates were placed in each of the latex compositions and allowed to stand in the emulsion which was maintained at ambient temperature for a period of 16 hours. The amount of residual peroxide present in each of the portions was determined by titration using potassium iodide and sodium thiosulfate prior to the addition of the sodium meta-bisulfite. The amount of residual peroxide present was 0.60 millimole.

The amounts of bisulfite added and its effect on the metal plates are reported in Table I following:

TABLE I

| Ex. | Amount of sodium metabisulfite added | | Condition of aluminum plate |
|---|---|---|---|
| | Millimole | Equivalents (ratio of bisulfite to peroxide) | |
| 2 | 0 | | Pitted badly—high degree of corrosion. |
| 3 | .20 | 0.6:1 | Do. |
| 4 | .25 | 0.8:1 | Very little corrosion. |
| 5 | .30 | 1:1 | No corrosion or pitting detected. |
| 6 | .35 | 1.2:1 | Very little corrosion. |
| 7 | .40 | 1.44:1 | Pitted badly—high degree of corrosion. |

These examples show that optimum blocking characteristics are realized when the polyvinylidene chloride emulsions contain substantially stoichiometric quantities of an alkali metal bisulfide.

Examples 8–12

A dispersion of polyvinylidene chloride as prepared in Example 1 was applied to glassine paper with a Keegan laboratory coater[1] modified so that two coats could be applied (wet or dry) in a single pass.

The coating was metered at both coating stations with wire wound rods (#5 and #0 at both stations). The emulsion was applied at 55–60% solids to obtain coat weights varying from 5 to 10 lbs./3,000 sq. ft.

The blocking characteristics of polyvinylidene chloride coated glassine were determined on the Interchemical block tester made by the Koehler Instrument Company, Inc., Jamaica, N.Y. A metal block with a compression surface milled to a circular area of 1 sq. inch was held at the desired pressure against the samples with a calibrated spring compressed by means of a screw in a clamping apparatus.

Samples to be tested for blocking were cut in 2-inch by 2-inch squares, stacked with the proper surfaces in contact (face to face to back), positioned in the blocking apparatus, and the complete apparatus (set at the desired pressure, 10 p.s.i.) was placed in an oven overnight, heated to a temperature of 125° F. The apparatus was allowed to equilibrate to room temperature before the compression was released.

Blocking was rated as follows:

Rating of blocking characteristics

| Rating, blocking resistance: | Description |
|---|---|
| 10 | Separated by sample weight. |
| 9 | |
| 8 | Separated by light sliding force. |
| 7 | |
| 6 | Separated by sliding force, audible tick. |
| 5 | |
| 4 | Pulled apart, slight picking. |
| 3 | |
| 2 | Pulled apart, much picking. |
| 1 | |
| 0 | Complete seal. |

A rating of 7 or more is considered acceptable.

The blocking characteristics for the polyvinylidene chloride polymeric film containing various amounts of sodium meta-bisulfite are reported below in Table II.

TABLE II

| Example | Mol ratio of bisulfite to residual peroxides | Blocking rating |
|---|---|---|
| 8 | 0:1.0 | 3 |
| 9 | 0.4:1.0 | 5 |
| 10 | 0.7:1.0 | 7 |
| 11 | 1.0:1.0 | 9 |
| 12 | 1.4:1.1 | 6 |

[1] Keegan Manufacturing Company, Detroit, Mich.

What is claimed is:

1. A stabilized, essentially non-corrosive vinylidene chloride polymer latex composition which contains on a polymerized polymer weight basis from 70–97% vinylidene chloride comprising the product resultnig from the treatment of a vinylidene chloride polymer latex containing residual peroxides at a pH of less than 5.5 with a reducing metal sulfite in an amount of between 0.7 and 1.3 equivalents of metal sulfite per equivalent of residual peroxide.

2. The composition according to claim 1 resulting from the treatment of the residual peroxide with about a stoichiometric amount of an alkali metal bisulfite.

3. The composition of claim 2 wherein the vinylidene chloride polymer latex composition contains from about 70–97% vinylidene chloride and from about 3–30% of at least one other ethylenically unsaturated comonomer copolymerized with said vinylidene chloride monomer.

4. The composition of claim 3 wherein the other ethylenically unsaturated comonomer is a compound selected from the group consisting of alkyl esters of alpha,beta-ethylenically unsaturated monocarboxylic acid containing from 1 to 18 carbon atoms in the alkyl group, alpha,beta-ethylenically unsaturated acids, alpha,beta-ethylenically unsaturated nitriles, alpha,beta-ethylenically unsaturated amides, vinyl halides, diesters of alpha,beta-ethylenically unsaturated dicarboxylic acids, and alkyl vinyl ketones.

5. The composition of claim 1 wherein the metal sulfite is an alkali metal bisulfite in an amount ranging from 0.8 to 1.2 equivalents of alkali metal bisulfite per equivalent of residual peroxide.

6. The composition of claim 5 wherein the alkali metal bisulfite is sodium meta-bisulfite.

7. The process for rendering a 70–97% vinylidene chloride polymer latex emulsion containing residual peroxide substantially non-corrosive to metals comprising treating said latex at a pH of less than 5.5 with corrosion inhibiting quantities of a reducing agent capable of neutralizing or deactivating peroxides, wherein the amount of reducing agent ranges from 0.7 to 1.3 equivalents per equivalent of peroxide.

8. The process of claim 7 wherein the reducing agent is an alkali metal bisulfite.

9. The process of claim 8 wherein the alkali metal bisulfite is sodium meta-bisulfite.

10. The process of claim 9 wherein the treatment comprises adding the bisulfite in an amount of between 0.7 and 1.3 equivalents of bisulfite per equivalent of residual peroxide and the vinylidene chloride polymer latex composition contains from about 70–97% vinylidene chloride copolymerized with about 3–30% of another ethylenically unsaturated comonomer other than said vinylidene chloride.

11. The process of claim 10 wherein the vinylidene chloride polymer latex is treated at a pH of less than 5.0 with about a stoichiometric amount of an alkali metal bisulfite and the residual peroxide comprises hydrogen peroxide.

12. The method according to claim 10 wherein the other ethylenically unsaturated comonomer is selected from the group consisting of alkyl esters of alpha,beta-ethylenically unsaturated monocarboxylic acid containing from 1 to 18 carbon atoms in the alkyl group, alpha,beta-ethylenically unsaturated acids, alpha,beta-ethylenically unsaturated nitriles, alpha,beta-ethylenically unsaturated amides, vinyl halides, diesters of alpha,beta-ethylenically unsaturated dicarboxylic acids and alkyl vinyl ketones, and the amount of bisulfite ranges from 0.8 to 1.2 equivalents per equivalent of residual peroxide.

References Cited

UNITED STATES PATENTS

| | | | |
|---|---|---|---|
| 3,032,521 | 5/1962 | Sanderson | 260—29.6 R |
| 3,247,150 | 4/1966 | Hahn et al. | 260—29.6 MQ |
| 3,261,798 | 7/1966 | Farley | 260—29.6 R |

OTHER REFERENCES

Schildknecht, Calvin E., Vinyl and Related Polymers (John Wiley & Sons, New York), 1952, pp. 449–451, TP986V43S.

LUCILLE M. PHYNES, Primary Examiner

U.S. Cl. X.R.

260—63 HA, 29.6 RW, 78.5 T, 80.76, 80.77, 80.8, 80.21, 86.3, 87.7, 91.7, 92.8 A

UNITED STATES PATENT OFFICE
CERTIFICATE OF CORRECTION

Patent No. 3,796,680          Dated March 12, 1974

Inventor(s) Charles E. Brockway and David R. Smith

It is certified that error appears in the above-identified patent and that said Letters Patent are hereby corrected as shown below:

Column 2, line 30; for "lithium, bisulfite," read ---lithium bisulfite,---.
Column 3, line 20; for "85 and 94%...vinylidene" read ---85 to 94% vinylidene---.
Column 3, bridging lines 35 to 37; for "ethacrylonitrile; alpha, beta-ethylenically unsaturated ethacrylonitrile; alpha, beta-ethylenically unsaturated amides," read ---ethacrylonitrile; alpha, beta-ethylenically unsaturated amides,---.
Column 4, line 19; for "no" read ---not---.
Column 4, line 53; for "2,909,499" read ---2,909,449---.
Column 6, line 16; for "bisulfide" read ---bisulfite---
Column 7, line 10; for "resultnig" read ---resulting---.
Column 7, line 39; for "a 70-97% vinylidene" read ---a 70-97% by weight vinylidene---.

Signed and sealed this 1st day of October 1974.

(SEAL)
Attest:

McCOY M. GIBSON JR.
Attesting Officer

C. MARSHALL DANN
Commissioner of Patents